(12) United States Patent
Whitmore et al.

(10) Patent No.: US 11,408,376 B2
(45) Date of Patent: Aug. 9, 2022

(54) THRUST AUGMENTATION OF AN ADDITIVELY MANUFACTURED HYBRID ROCKET SYSTEM USING SECONDARY OXIDIZER INJECTION

(71) Applicants: Stephen Whitmore, Logan, UT (US); Mark C. Heiner, Logan, UT (US)

(72) Inventors: Stephen Whitmore, Logan, UT (US); Mark C. Heiner, Logan, UT (US)

(73) Assignee: Utah State University, Logan, UT (US)

(*) Notice: Subject to any disclaimer, the term of this patent is extended or adjusted under 35 U.S.C. 154(b) by 175 days.

(21) Appl. No.: 16/990,586

(22) Filed: Aug. 11, 2020

(65) Prior Publication Data

US 2020/0370513 A1  Nov. 26, 2020

Related U.S. Application Data

(63) Continuation-in-part of application No. 16/362,430, filed on Mar. 22, 2019, now Pat. No. 10,774,789, (Continued)

(51) Int. Cl.
*F02K 9/72* (2006.01)
*F02K 9/26* (2006.01)
(Continued)

(52) U.S. Cl.
CPC .............. *F02K 9/72* (2013.01); *F02K 9/14* (2013.01); *F02K 9/26* (2013.01); *F02K 9/52* (2013.01)

(58) Field of Classification Search
CPC ... B64G 1/404; F02K 9/08; F02K 9/14; F02K 9/26; F02K 9/52; F02K 9/72; F02K 9/82; F02K 9/94; F02K 9/95
See application file for complete search history.

(56) References Cited

U.S. PATENT DOCUMENTS 3,132,475 A * 5/1964 Hopper .............. F02K 9/72
  60/251
3,164,093 A * 1/1965 Holzman ............ F02K 9/72
  102/291

(Continued)

FOREIGN PATENT DOCUMENTS

DK    2524727 A1   5/2011
NL    1533511 A1   11/2003

OTHER PUBLICATIONS

Whitmore et al, "Thrust Augmentation of an Additively Manufactured Hybrid Rocket System Using Secondary H2O2 Injection", AIAA Propulsion and Energy Forum and Exposition, Aug. 26, 2019, Indianapolis, IN, USA.

(Continued)

*Primary Examiner* — Loren C Edwards

(57) ABSTRACT

A hybrid rocket includes a housing having first and second ends, a solid-grain fuel material in the housing and defining a bore extending from end to end, two electrodes positioned adjacent to the fuel material to ignite the fuel material at the first end, a primary oxidizer port positioned at the first end to inject a primary oxidizer to flow in a downstream direction from the first end to the second end, a nozzle positioned at the second end and having a converging portion and a diverging portion, and a secondary oxidizer port to inject a secondary oxidizer downstream of the converging portion. The bore has a geometry configured to produce a hot-gas, fuel-rich mixture at the nozzle as the fuel material and primary oxidizer burn while flowing downstream. The (Continued)

diverging portion of the nozzle is configured to spontaneously combust the secondary oxidizer and the hot-gas, fuel-rich mixture.

18 Claims, 8 Drawing Sheets

Related U.S. Application Data which is a continuation-in-part of application No. 14/802,537, filed on Jul. 17, 2015, now Pat. No. 10,527,004, which is a continuation-in-part of application No. 13/953,877, filed on Jul. 30, 2013, now abandoned.

(60) Provisional application No. 62/647,401, filed on Mar. 23, 2018, provisional application No. 62/026,420, filed on Jul. 18, 2014, provisional application No. 61/677,254, filed on Jul. 30, 2012, provisional application No. 61/677,266, filed on Jul. 30, 2012, provisional application No. 61/677,418, filed on Jul. 30, 2012, provisional application No. 61/677,426, filed on Jul. 30, 2012, provisional application No. 61/677,298, filed on Jul. 30, 2012.

(51) Int. Cl.
*F02K 9/52* (2006.01)
*F02K 9/14* (2006.01)

(56) References Cited

U.S. PATENT DOCUMENTS

| | | | |
|---|---|---|---|
| 4,795,938 A | 1/1989 | Meredith | |
| 5,715,675 A * | 2/1998 | Smith | F02K 9/72 60/251 |
| 5,722,232 A * | 3/1998 | Jones | F02K 9/50 60/251 |
| 5,892,319 A | 4/1999 | Rossi | |
| 6,058,697 A | 5/2000 | Smith | |
| 6,354,074 B1 * | 3/2002 | Jones | F02K 9/72 60/204 |
| 6,393,830 B1 | 5/2002 | Hamke | |
| 6,779,335 B2 | 8/2004 | Herdy | |
| 7,716,912 B2 | 5/2010 | Cover | |
| 8,015,920 B1 | 9/2011 | Wilkinson | |
| 8,225,507 B2 | 7/2012 | Fuller | |
| 8,327,617 B2 | 12/2012 | Gustafsson | |
| 8,539,753 B2 | 9/2013 | Macklin | |
| 10,527,004 B2 | 1/2020 | Whitmore | |
| 10,774,789 B2 | 9/2020 | Whitmore | |
| 2002/0121081 A1 * | 9/2002 | Cesaroni | F02K 9/72 60/251 |
| 2003/0136111 A1 | 7/2003 | Kline et al. | |
| 2004/0068979 A1 | 4/2004 | Kline | |
| 2009/0217525 A1 * | 9/2009 | Fuller | F02K 9/36 29/890.01 |
| 2009/0217642 A1 | 9/2009 | Fuller | |
| 2012/0060468 A1 | 3/2012 | Dushku et al. | |
| 2012/0285016 A1 | 7/2012 | Fuller | |
| 2013/0031888 A1 | 2/2013 | Fuller | |
| 2013/0042596 A1 | 2/2013 | Fuller | |
| 2014/0026537 A1 | 1/2014 | Eilers | |
| 2016/0356245 A1 | 12/2016 | Danforth | |
| 2017/0073280 A1 | 3/2017 | Jones | |
| 2017/0234268 A1 | 8/2017 | Summers | |

OTHER PUBLICATIONS

Marshall et al, "Thrust Augmented Nozzle for a Hybrid Rocket with a Helical Fuel Point", 53rd AIAA/SAE/ASEE Joint Propulsion Conference, Jul. 7, 2017, Atlanta, GA, USA.

Whitmore et al, "High Regression Rate Hybrid Rocket Fuel Grains with Helical Port Structures", Journal of Propulsion and Power, 2015, pp. 1727-1738, vol. 31, No. 6.

Whitmore & Walker, "Engineering Model for Hybrid Fuel Regression Rate Amplification Using Helical Ports", Journal of Propulsion and Power, 2017, pp. 398-407, vol. 33, No. 2.

Whitmore et al., "High-Performing Hydrogen Peroxide Hybrid Rocket with 3-D Printed and Extruded ABS Fuel", Aeronautics and Aerospace Open Access Journal, Nov. 2018, vol. 2, No. 6.

Whitmore et al., "Development of a Power—Efficient, Restart-Capable Arc Ignitor for Hybrid Rockets", 50th AIAA/ASME/SAE/ASEE Joint Propulsion Conference and Exhibit, Jul. 28, 2014 AIAA-2014-3949, American Institute of Aeronautics and Astronautics, Cleveland OH.

Whitmore, "Direct Ignition of a High Performance Hydrogen Peroxide Hybrid Rocket with 3-D Printed Fuel", Int. J. of Astronautics and Aeronautical Eng., 2019, vol. 4, No. 21.

Lindley, "Performance of Air-Breathing and Rocket Engines for Hypervelocity Aircraft", 4th Congress of the International Council of the Aeronautical Sciences, pp. 941-975.

Wilson et al., Catalytic decomposition of nitrous oxide monopropellant for hybrid motor re-ignition, 47th AIAA/ASME/SAE/ASEE Joint Propulsion Conference & Exhibit, Jul. 31, 2011.

Eilers et al., Regeneratively cooled multiple-use plug hybrid for nanosatellites, Journal of Propulsion and Power, 2013, vol. 29, No. 6, pp. 1420-1434.

McCulley, et al., Design and testing of fdm manufactured paraffin-abs hybrid rocket motors, 48th AIAA/ASME/SAE/ASEE Joint Propulsion Conference & Exhibit, Jul. 29, 2012.

Peterson et al., Closed-loop thrust and pressure profile throttling of a nitrous-oxide hfpb hybrid rocket motor, 48th AIAA/ASME/SAE/ASEE Joint Propulsion Conference & Exhibit, Jul. 29, 2012.

Whitmore et al., Analytical and experimental comparisons of htpb and abs as hybrid rocket fuels, 47th AIAA/ASME/SAE/ASEE Joint Propulsion Conference & Exhibit, Jul. 31, 2011.

Goldstein, The Greening of Satellite Propulsion, Aerospace America, Feb. 2012.

Safie, F.M., and Fox, E. P., A probabilistic design analysis approach for launch systems, AIAA-1991-1186, 27th AIAA, SAE, ASME, and ASEE, Joint Propulsion Conference, Sacramento, CA, USA; Jun. 24-26, 1991.

Chang, Investigation of Space Launch Vehicle Catastrophic Failures, Journal of Spacecraft and Rockets, vol. 33, No. 2, Mar.-Apr. 1996.

Maggio, G., Space Shuttle Probabilistic Risk Assessment; Methodology and Application, International Symposium on Product Quality and Integrity, Proceedings of the Reliability and Maintainability Symposium, Las Vegas, NV, USA, Jan. 22-25, 1996.

Gibbon et al., Investigation of an Alternative Geometry Hybrid Rocket for Small Spacecraft Orbit Transfer, Tech, rep., Surrey Satellite Technology LTD, Jul. 27, 2001.

Knuth et al., Solid-Fuel Regression Rate Behavior of Vortex Hybrid Rocket Engines, The Journal of Propulsion and Power, vol. 18, No. 3, pp. 600-609, May-Jun. 2002.

Lemieux, P., Nitrous Oxide Cooling in Hybrid Rocket Nozzles, Progress in Aerospace Sciences, vol. 46 pp. 106-115, Dec. 29, 2009.

Lemieux, P., Development of Reusable Aerospike Nozzle for Hybrid Rocket Motors, 39th AIAA Fluid Dynamics Conference, Jun. 22, 2009.

Grieb, J., Design and Analysis of a Reusable N2O-Cooled Aerospike Nozzle for Labscale Hybrid Rocket Motor Testing, Master's Thesis presented to the Faculty of California Polytechnic State University, Feb. 2012.

Mayer, E., Analysis of Convective Heat Transfer in Rocket Nozzles, ARS Journal, pp. 911-916, 1961.

Gordon, S. & McBride, B. J., "Computer Program for Calculation of Complex Chemical Equilibrium Compositions and Applications I. Analysis," Tech. rep. NASA RP-1311, 1994.

McBride, B. J. & Gordon, S., Computer Program for Calculation of Complex Chemical Equilibrium Compositions and Applications II, Users Manual and Program Description, Tech. rep., NASA RP-1311, Oct. 1994.

(56) References Cited

OTHER PUBLICATIONS

Span, R. & Wagner, W., Equations of State for Technical Applications. I. Simultaneously Optimized Forms for Nonpolar and Polar Fluids, International Journal of Thermophysics, vol. 24, No. 1, pp. 1-39, Jan. 1, 2003.
Span, R. & Wagner, W., Equations of State for Technical Applications. II. Results for Nonpolar Fluids, International Journal of Thermophysics, vol. 24, No. 1, pp. 41-109, Jan. 1, 2003.
Span, R. & Wagner, W., Equations of State for Technical Applications. III. Results for Polar Fluids, International Journal of Thermophysics, vol. 24, No. 1, pp. 111-162, Jan. 1, 2003.
Dyer et al., Modeling Feed System Flow Physics for Self Pressurizing Propellants, 43rd AIAA/ASME/SAE/ASEE Joint Propulsion Conference & Exhibit, Jul. 8, 2007.
Whitmore, Electrostatic Igniter for an Additively Manufactured Acrylonitirile-Butadiene-Styrene-Nitrous-Oxide Hybrid Rocket Motor, Journal of Propulsion and Power, Apr. 28, 2015, pp. 1217-1220, vol. 31, No. 4.
USPTO, Non-Final Office Action for U.S. Appl. No. 13/953,877 for "Multiple Use Hybrid Rocket Motor" filed Jul. 30, 2013, Office Action dated Jan. 20, 2016.
Eilers et al., Analytical and Experimental Evaluation of Aerodynamic Thrust Vectoring on an Aerospike Nozzle, 46th AIAA/ASME/SAE/ASEE Joint Propulsion Conference & Exhibit, Jul. 25, 2010, Nashville, TN.
Approctech, Pyro Free Ignition of Hybrid Rocket Motor with Wax/Epoxy Resin Grain, YouTube.com, https://www.youtube.com/watch?v=wkq2MiMKp8w; Nov. 9, 2010.
Whitmore et al., "Enhanced performance of an enriched air/ABS hybrid rocket using oxidizing fuel additives". 54th AIAA/SAE/ASEE Joint Propulsion Conference Jul. 9, 2018. Cincinnati, Ohio.
Whitmore et al., "A green hybrid thruster user moderately enriched compressed air as the oxidizer." 54th AIAA/SAE/ASEE Joint Propulsion Conference. Jul. 9, 2018. Cincinnati, Ohio.
Eilers et al., Development and testing of regeneratively cooled multiple use plug hybrid (for) nanosats (MUPHyN) motor, 48th AIAA/ASME/SAE/ASEE Joint Propulsion Conference & Exhibit, Jul. 29, 2012.
USPTO, Final Office Action for U.S. Appl. No. 14/802,537 for "Restartable Ignition Devices, Systems, and Methods Thereof" filed Jul. 7, 2015, Office Action dated Aug. 31, 2018.
USPTO, Final Office Action for U.S. Appl. No. 14/802,537 for "Restartable Ignition Devices, Systems, and Methods Thereof" filed Jul. 17, 2015, Office Action dated May 23, 2019.

* cited by examiner

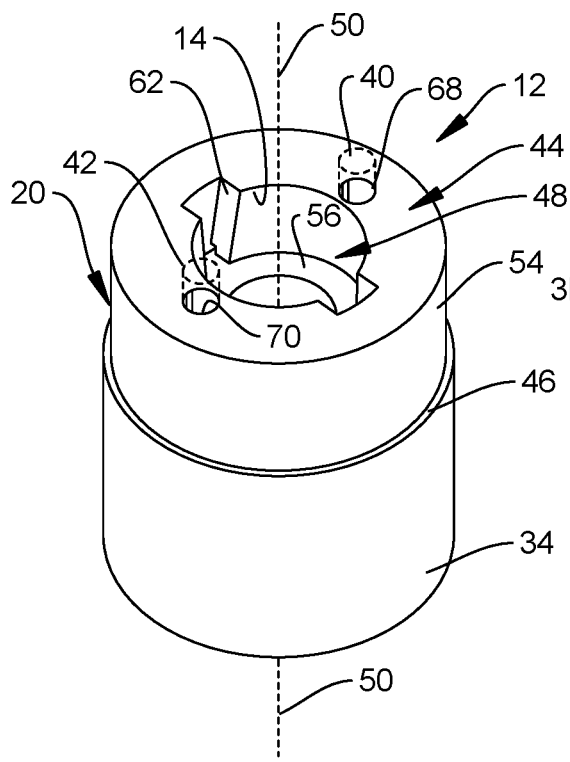
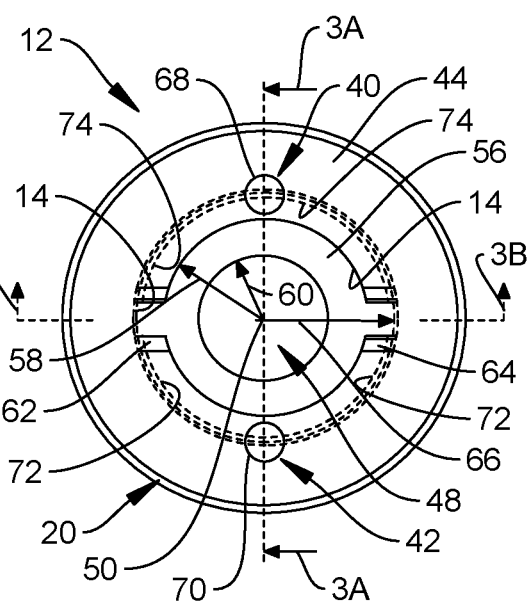
FIG. 2
FIG. 3
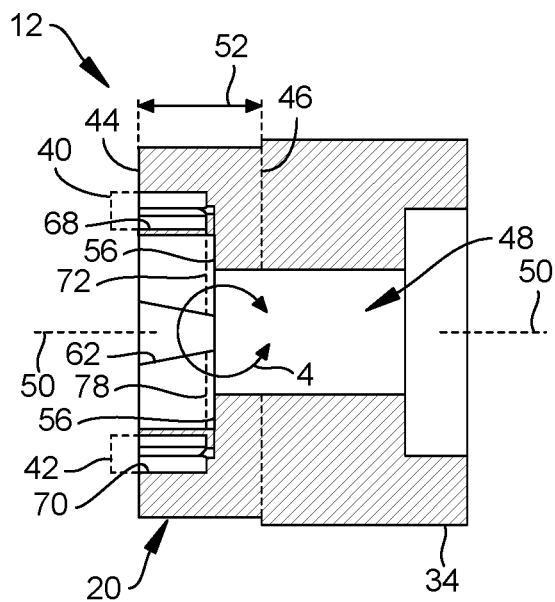
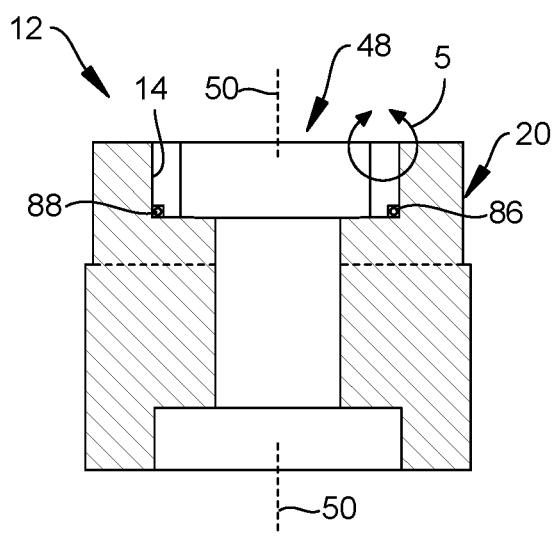
FIG. 3A
FIG. 3B

THRUST AUGMENTATION OF AN ADDITIVELY MANUFACTURED HYBRID ROCKET SYSTEM USING SECONDARY OXIDIZER INJECTION

CROSS-REFERENCE TO RELATED APPLICATIONS

This application is a continuation-in-part to U.S. Non-provisional application Ser. No. 16/362,430, filed on Mar. 22, 2019, and entitled "Methods and Systems for Restartable, Hybrid-Rockets," which is incorporated by this reference in its entirety.

Ser. No. 16/362,430 claims priority to U.S. Provisional Application No. 62/647,401, filed on Mar. 23, 2018, entitled "Methods and Systems for Green Rockets Using a Compressed-Air Oxidizer," which is herein incorporated by this reference in its entirety. Ser. No. 16/362,430 is also a continuation-in-part application to U.S. Non-provisional application Ser. No. 14/802,537, filed on Jul. 17, 2015, and entitled "Restartable Ignition Devices, Systems, and Methods Thereof," which is incorporated by this reference in its entirety. Ser. No. 14/802,537 is now U.S. Pat. No. 10,527,004, issued Jan. 7, 2020.

Application Ser. No. 14/802,537 claims priority to U.S. Provisional Application No. 62/026,420, filed on Jul. 18, 2014, and entitled "Restartable Ignition Devices, Systems, and Methods Thereof," which is herein incorporated by this reference in its entirety. Application Ser. No. 14/802,537 is also a continuation-in-part application to U.S. Non-provisional application Ser. No. 13/953,877, filed on Jul. 30, 2013, entitled "Multiple Use Hybrid Rocket Motor," which is hereby incorporated by reference in its entirety.

Application Ser. No. 13/953,877 claims priority to U.S. Provisional Application Nos. 61/677,254; 61/677,266; 61/677,418; 61/677,426; and 61/677,298; all filed Jul. 30, 2012, and all of which are hereby incorporated by reference in their entirety.

GOVERNMENT SPONSORED RESEARCH

This invention was made with government support under contract NNX12AN12G awarded by NASA. The government has certain rights in the invention.

TECHNICAL FIELD

The present invention relates generally to hybrid rocket systems and, more specifically, to devices, systems and methods of an ignition portion of a hybrid rocket system.

BACKGROUND

Traditionally, high-expansion ratio nozzles that are efficient in producing high levels of momentum thrust have been limited to in-space operations. Lift-off stages of conventional launch vehicles generally require either very high chamber pressure levels or low expansion ratios in order ensure that the nozzle exit pressures are sufficiently high so as not to produce suction drag, or in the extreme case, allow internal nozzle flow separation and embedded shock waves. In addition to performance loss, flow separation poses the risk of nozzle spalling or burn through. This requirement for low expansion ratios means that lift-off stages are typically burned for only a small portion of the endo-atmospheric flight path. The result is that multiple intermediate stages with locally optimized nozzles are required to reach orbit. In most cases these stages are consumed during launch The current state of the art for hybrid rocket ignition systems is largely based on pyrotechnic ignition methods. These methods have serious shortcomings including the inability to initiate multiple re-starts using a single device, thus, limiting the applicability of the hybrid rocket. Other shortcomings include significant physical and environmental hazards. For example, making rockets safer, less toxic, and less explosive comes at a significant cost. As the propellant materials become less volatile, they also become increasingly difficult to ignite. Combustion of hybrid propellants must be initiated by an igniter that provides sufficient heat to cause pyrolysis of the solid fuel grain at the head end of the motor, while simultaneously providing sufficient residual energy to overcome the activation energy of the propellants to initiate combustion. Thus, hybrid rockets have typically used large, high output pyrotechnic charges to initiate combustion. Such igniters are capable of producing very high-enthalpy outputs, but are extremely susceptible to hazards of electromagnetic radiation and present significant operational hazards. Most importantly, such pyrotechnic igniters are designed as "one-shot" devices that do not allow multiple re-start capability.

Conventional fixed-geometry rocket nozzles allow optimum performance only at one specific ambient pressure or operating altitude. Thus, conventional nozzles necessarily represent a design compromise. In a conventional nozzle, combustion gases are choked by a cylindrical throat and then expand through a diverging nozzle pathway, exchanging thermal energy for kinetic energy, and creating a large increase in momentum of the exit plume. The optimal operating condition for a conventional nozzle occurs when the pressure at the exit plane exactly equals the background ambient pressure, and this condition is set by the chamber pressure and expansion ratio. For the conventional nozzle, careful design is needed to achieve desired high altitude (under-expanded operating conditions) performance while avoiding flow separation and an embedded shock wave when operating at low altitudes (over-expanded operating conditions).

The over-expanded nozzle develops an exit pressure that is less than the surrounding atmospheric pressure, and a locally negative pressure gradient results. When the negative pressure gradient becomes sufficiently strong, boundary layer separation and backflow can form along the nozzle walls. Backflow and flow separation typically result in the formation of an embedded shockwave. The embedded shockwave leads to a loss of performance, and possible structural failure due to high heating levels at the shock-wall interface and dynamic loads due to flow separation.

For under-expanded conditions the nozzle is fully started and isentropic; however, the exit plane pressure is substantially higher than ambient; meaning that the only a portion of the thermal energy of the plume has been recovered and converted into kinetic energy. The result is the potential for a considerable loss in the available nozzle momentum thrust. Consequently, typically lower expansion ratio nozzles are used for low-altitude operation, and high expansion ratio nozzles are reserved for near-space operations. Few designs are able to bridge the gaps between operating altitudes.

Opportunities exist for improvements in rocket nozzles that lead to increased performance at various altitudes.

BRIEF SUMMARY OF THE INVENTION

The inventors of the present disclosure have identified that it would be advantageous to provide a hybrid rocket ignition system that has re-start capability that also is safe, less toxic, and less explosive than the current state-of-the-art rocket systems.

Embodiments of the present invention are directed to various devices, systems and methods of providing a restartable ignition device for a hybrid rocket system. For example, in one embodiment, an ignition device includes a housing and at least two electrodes. The housing includes a first side and a second side and defines a bore with an axis extending therethrough between the first and second sides, the bore defining an internal surface of the housing. The at least two electrodes extend through the housing to the internal surface. The at least two electrodes are configured to be spaced apart so as to provide an electrical potential field along the internal surface between the at least two electrodes. Such housing is formed with and includes multiple flat layers such that the multiple flat layers provide ridges along the internal surface. With this arrangement, the internal surface with the ridges are configured to concentrate an electrical charge upon being subjected to the electrical potential field.

In one embodiment, the ridges, under the electrical potential field, act as miniature electrodes to arc the electrical charge. In another embodiment, the internal surface includes grooves, each groove extending between two adjacently extending ridges. In still another embodiment, each of the ridges are a periphery of each of the multiple flat layers.

In another embodiment, the multiple flat layers each define a plane oriented transverse relative to the axis of the bore. In another embodiment, the at least two electrodes define a line therebetween, the line being generally parallel with a plane defined by each of the multiple flat layers.

In another embodiment, the internal surface defines a step configuration such that the bore at the first side is larger than the bore at the second side, the step configuration exhibiting a shelf extending to a shelf notch, the shelf notch having the at least two electrodes. In another embodiment, the bore at the first side defines a first width and the bore at the second side defines a second width, the first width greater than the second width. In yet another embodiment, the bore includes a convergent configuration extending from the first side to the second side.

In another embodiment, the multiple layers are an Acrylonitrile Butadiene Styrene (ABS) material. Such multiple layers may be formed with a fused deposition modeling process or three-dimensional printing.

In accordance with another embodiment of the present invention, a method of forming an ignition device, is provided. The method includes: forming a housing with multiple flat layers, the housing having a first side and a second side defining a bore with an axis extending through the housing and between the first and second sides such that the bore is defined by an internal surface of the housing; and positioning at least two electrodes to extend through the housing to the internal surface such that the at least two electrodes are spaced and configured to provide an electrical potential field along the internal surface between the at least two electrodes; wherein the forming the housing with multiple flat layers step includes forming the internal surface to include ridges, the ridges along the internal surface being configured to concentrate an electrical charge upon being subjected to the electrical potential field.

In one embodiment, the method step of forming the internal surface to include ridges includes the step of forming multiple miniature electrodes configured to arc the electrical charge between the at least two electrodes. In another embodiment, the method step of forming the housing with multiple flat layers includes the step of forming the multiple flat layers in a plane oriented transverse relative to the axis of the bore. In still another embodiment, the method step of positioning the at least two electrodes includes the step of positioning the at least two electrodes to define a line therebetween such that the line is generally parallel with a plane defined by each of the multiple flat layers.

In another embodiment, the method step of forming the housing with multiple flat layers includes the step of forming the bore of the housing to include a step configuration to define a shelf. In another embodiment, the method step of forming the housing with multiple flat layers includes forming the bore of the housing to include a convergent configuration extending from the first side to the second side of the housing.

In another embodiment, the method step of forming the housing with multiple flat layers includes the step of forming the housing with layers of a solid grain fuel material. In another embodiment, the method step of forming the housing with multiple flat layers includes forming the housing with layers of an Acrylonitrile Butadiene Styrene (ABS) material.

In accordance with another embodiment of the present invention, a hybrid rocket system is provided. The hybrid rocket system includes a container, an ignition portion, a solid grain combustion portion, a post combustion portion, and a nozzle. The container is sized to contain liquid or gaseous fuel. The ignition portion includes a first side and a second side, the ignition portion defining a bore with an axis extending therethrough between the first and second sides, the bore defined by an internal surface and the bore configured to receive the fuel from the container. The ignition portion includes at least two electrodes configured to provide an electrical potential field along the internal surface between the at least two electrodes. The solid grain combustion portion defines a combustion chamber such that the combustion chamber corresponds with the bore of the ignition portion. The post combustion portion is coupled to the solid grain combustion portion. The nozzle is coupled to the post combustion portion and is configured to manipulate thrust to the rocket system. The ignition portion is formed with and includes multiple flat layers such that the multiple flat layers provide ridges along the internal surface. With this arrangement, the internal surface with the ridges are configured to concentrate an electrical charge generally between the at least two electrodes upon being subjected to the electrical potential field.

In one embodiment, the multiple flat layers each define a plane oriented transverse relative to the axis of the bore.

In another embodiment, a hybrid rocket includes a housing having first and second ends, a solid-grain fuel material positioned in the housing and defining a bore that extends from the first end to the second end, at least two electrodes positioned adjacent to the fuel material to ignite the fuel material at the first end, a primary oxidizer port positioned at the first end to inject a primary oxidizer to flow in a downstream direction from the first end to the second end, a nozzle positioned at the second end and having a converging portion and a diverging portion, and a secondary oxidizer port to inject a secondary oxidizer downstream of the converging portion. The bore has a geometry configured to produce a hot-gas, fuel-rich mixture at the nozzle as the fuel material and primary oxidizer burn while flowing downstream. The diverging portion of the nozzle is configured to spontaneously combust the secondary oxidizer and the hot-gas, fuel-rich mixture.

The fuel material may include a plurality of flat layers of solid-grain fuel material. The secondary oxidizer may include $H_2O_2$. The bore geometry may include a helix. The fuel material may define an internal surface exposed within the housing, and the at least two electrodes may extend through the housing to the internal surface. The at least two electrodes may produce localized electrical arcing to ignite the solid-grain fuel material. The at least two electrodes may be configured to be spaced apart so as to provide an electrical potential field along a surface of the solid-grain fuel material that is positioned between the at least two electrodes. The fuel material may include an internal surface with exposed ridges, and the at least two electrodes may be configured to concentrate an electrical charge on the ridges to ignite the internal surface. The hybrid rocket may be configured such that as the fuel material at the internal surface is initially consumed or removed through combustion of the fuel material, newly exposed ridges are available for re-igniting the fuel material upon being subjected to the electrical charge. The solid-grain fuel material may be an Acrylonitrile Butadiene Styrene (ABS) material.

A further embodiment is directed to a hybrid rocket that includes a solid-grain fuel material, an electrode assembly operable to ignite the fuel material, a nozzle having a converging portion and a diverging portion, an additive oxidant port to provide an additive oxidant downstream of the converging portion, the additive oxidant comprising at least 85% H2O2.

The hybrid rocket may further include a helical port extending through the housing to provide hot-gas, fuel-rich mixture upstream of the nozzle for combusting the fuel material in the diverging portion. The hybrid rocket may further include a housing having first and second ends, and an injector positioned at the first end of the housing, and the nozzle may be positioned at the second end of the housing. The fuel material may include a plurality of flat layers of solid grain fuel material. The electrode assembly may produce localized electrical arcing to ignite the solid-grain fuel material. The fuel material may include an internal surface with exposed ridges, and the at least two electrodes may be configured to concentrate an electrical charge on the ridges to ignite the internal surface. The hybrid rocket may be configured such that as the fuel material at the internal surface is initially consumed or removed through combustion of the fuel material, newly exposed ridges are available for re-igniting the fuel material upon being subjected to the electrical charge.

Another embodiment relates to a method of augmenting combustion in a hybrid rocket. The method includes providing a housing having first and second ends, solid grain fuel material positioned in the housing, at least two electrodes positioned adjacent to the fuel material, a nozzle positioned at the second end and having a converging portion and a diverging portion, a bore extending through the housing, a primary oxidant portion positioned at a first end, and an secondary oxidant port positioned downstream of the converging portion. The method also includes delivering oxidant through the bore, igniting the fuel material with the at least two electrodes, delivering a hot-gas, fuel-rich mixture to the nozzle, and delivering additive oxidant through the secondary oxidant port to augment combustion of the hot-gas, fuel-rich mixture in the diverging portion.

The method may further include providing the fuel material with an internal surface, the internal surface including exposed ridges, and the at least two electrodes may be configured to concentrate an electrical charge on the ridges to ignite the internal surface. The hybrid rocket may be configured such that as the fuel material at the internal surface is initially consumed or removed through combustion of the fuel material, newly exposed ridges are available for re-igniting the fuel material upon being subjected to the electrical charge. The additive oxidant may include at least 85% H2O2, and the fuel material may include Acrylonitrile Butadiene Styrene (ABS) material. The additive oxidant port may include a plurality of secondary oxidant ports positioned circumferentially around the divergent portion of the nozzle. The bore may be helical.

BRIEF DESCRIPTION OF THE SEVERAL VIEWS OF THE DRAWINGS

The foregoing and other advantages of the invention will become apparent upon reading the following detailed description and upon reference to the drawings in which:

FIG. 2 is a perspective view of an igniter system of a hybrid rocket system, according to another embodiment of the present invention;

FIG. 3 is top view of the igniter system of FIG. 2, according to another embodiment of the present invention;

FIG. 3A is a cross-sectional view of the igniter system taken along section 3A of FIG. 3, according to another embodiment of the present invention;

FIG. 3B is a cross-sectional view of the igniter system taken along section 3B of FIG. 3, according to another embodiment of the present invention;

DETAILED DESCRIPTION OF THE INVENTION

Figure 1:
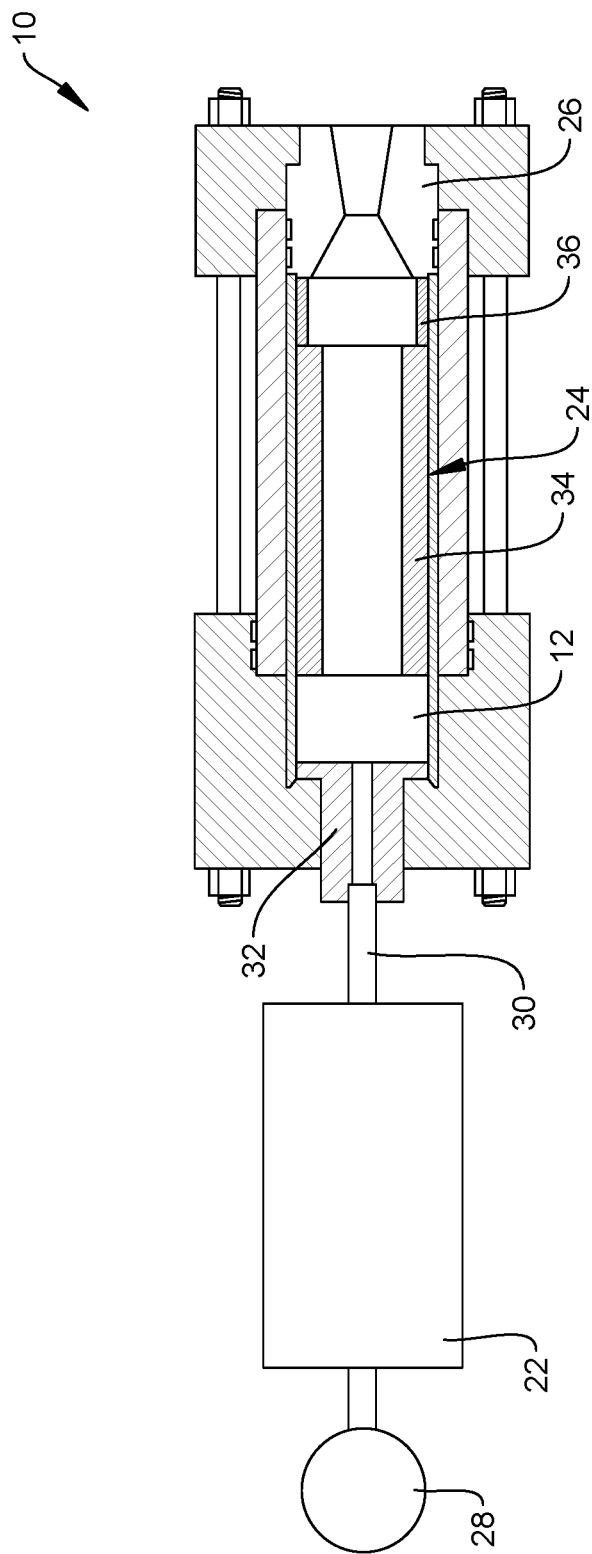
FIG. 1 is a simplified side view of a hybrid rocket system, according to one embodiment of the present invention.
Figure 6:
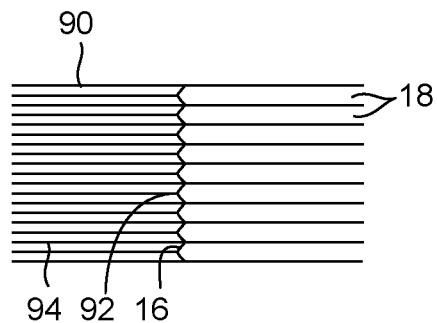
FIG. 6 is an enlarged view of detail 6 in FIG. 5, depicting ridges and grooves of the multiple layers defined in the igniter portion, according to another embodiment of the present invention.

Referring to FIGS. 1 and 2, a simplified view of a hybrid rocket system 10 or motor that includes an ignition system 12 or pre-combustion portion, according to the present invention, is provided. Referring to FIGS. 3A, 3B, and 6, in one embodiment, the ignition system 12 or pre-combustion portion may include a housing 20 formed of multiple flat layers 18 by employing fused deposition modeling (FDM) or three-dimensional printing. Such FDM process provides an internal surface 14 with ridges 16 formed from the multiple flat layers 18 deposited upon each other (See FIG. 6). The ignition system 12 may also include electrodes 86 and 88 spaced from each other and positioned adjacent the internal surface 14. Upon a propellant or oxidizer being injected into the system and activating an electrical potential field between the electrodes 86 and 88, the ridges 16 along the internal surface 14 may concentrate an electrical charge which seeds combustion of the solid grain fuel material.

As will be described herein, the unique structural characteristics of the material and structure of the internal surface 14 and housing 20 provide an ignition system 12 that is re-startable. For example, multiple re-starts have been implemented with the ignition system 12 set forth herein. The inventors have found that the only limitation to the number of allowable restarts is the quantity of solid fuel grain material contained within the ignition system 12. Such ignition system 12 may require small input energy and may use only non-toxic and non-explosive propellants with the simplicity and reliability of a monopropellant system, but with the output enthalpy equivalent to a bi-propellant igniter. As such, the re-startable ignition system 12 may have applicability to military aircraft, missile systems for post-stall maneuvering, emergency gas generation cycles, and many other applications relating to systems that may benefit from the re-startable ignition system.

With reference to FIG. 1, the basic components of the hybrid rocket system 10 may include a gaseous or liquid fuel container 22 or tank, a combustion portion 24, and a nozzle 26. The gaseous fuel or propellant may be nitrous oxide or gaseous oxygen or any other suitable gaseous or liquid propellant. The gaseous fuel container 22 may be disposed between a gas pressurization element 28 and a gas feed system 30. The gas feed system 30 may feed an injector portion 32, which in turn controllably injects propellant into the combustion portion 24 of the hybrid rocket system 10. The combustion portion 24 of the system may include multiple portions, such as, the ignition system 12 or pre-combustion portion, a main combustion portion 34, and a post combustion portion 36. The main combustion portion 34 may be formed of one or more solid grain fuels, such as acrylic or hydroxyl-terminated polybutadiene (HTPB), or any other suitable solid grain propellant known in the art. In one embodiment, the solid grain propellant for the main combustion portion 34 and post combustion portion 36 may be acrylonitrile butadiene styrene (ABS) or combinations of other known solid propellants. The combustion portion 24 and, more particularly, the post combustion portion 36 may be coupled to the nozzle 26 or other similar structure. The nozzle 26 may include various nozzle configurations, depending upon the application of a particular rocket system or the like. With this arrangement, the ignition system 12 of the present invention may be employed with the other components of the hybrid rocket system 10 to facilitate multiple re-starts with one device, i.e., without replacing parts.

Now with reference to FIGS. 2, 3 and 3A, various views of an ignition system 12 or pre-combustion portion are provided. As set forth, the ignition system 12 or pre-combustion portion may be directly coupled to the main combustion portion 34. The ignition system 12, as depicted in the illustrated example, is directly coupled to a shortened minimal portion of the main combustion portion 34. More important to this description is that the ignition system 12 or pre-combustion portion may include the housing 20 and first and second electrode components 40, 42.

In one embodiment, the housing 20 may include a sleeve like structure with various ports and notches therein and further, the sleeve like structure may include the internal surface 14 with a step configuration. For example, the housing 20 may include a first side 44 and a second side 46 with a bore 48 extending through and between the first and second sides 44, 46 of the housing 20. The second side 46 is illustrated as an interface surface between the housing 20 and main combustion portion 34. The bore 48 may define a centrally extending axis 50 along a length 52 of the housing 20. Further, the housing 20 may include an external surface 54 and the before mentioned internal surface 14. The external surface 54 may include cylindrical shape or any another suitable structure.

The internal surface 14 may define the bore 48 of the housing 20, the bore 48 defining a radial component such that a cross-section of the bore 48 may be defined as generally circular or any other suitable structure. Further, as set forth, the internal surface 14 may define a step configuration so as to include a shelf 56. In this manner, the bore 48 may include a first radius 58 and a second radius 60, the first radius 58 and the second radius 60 extending laterally from the axis 50 to the internal surface 14 of the housing 20. Such first radius 58 may extend along the length of the bore 48 from the first side 44 of the housing 20 to the shelf 56. The second radius 60 may extend along the length from the shelf 56 to the second side 46 of the housing 20. With this arrangement, the first radius 58 may be larger than the second radius 60 such that the bore 48 exhibits a larger opening on the first side 44 of the housing 20 than on the second side 46 of the housing 20.

With respect to FIGS. 2, 3, 3A, and 4, as set forth, the housing 20 may include various ports and/or notches therein. For example, in one embodiment, the bore 48 of the housing 20 may also include a first notch 62 and a second notch 64, each defined by the internal surface 14. The first and the second notches 62, 64 may be positioned on opposite sides of the bore 48 so as to face each other. Each of the first and second notches 62, 64 may extend between the shelf 56 and the first side 44 of the housing 20 such that the shelf 56 extends further at the notch to define a third radius 66 or a third dimension, the third radius 66 or dimension being larger than the first radius 58 and being defined from the axis 50 to the internal surface 14 at the first and second notches 62, 64. At least one of the first and second notches 62, 64 may be sized and configured to exhibit electrodes 86, 88 at, for example, base corners of the at least one of the first and second notches 62, 64 and adjacent the shelf 56, discussed in further detail herein.

Further, the housing 20 may include one or more ports for the electrode components. For example, the housing 20 may include a first port 68 and a second port 70. The first and second ports 68, 70 may be positioned opposite each other on the first side 44 of the housing 20. The first port 68 may define a first port cavity 72 (shown in outline form) extending from the first port 68 to a first port outlet 74. The first port outlet 74 may be disposed at a first base corner 76 of the first notch 62 on the shelf 56 and adjacent to the internal surface 14 having the third radius 66. Similarly, the second port 70 may extend with a second port cavity 78 to a second port outlet 80 at a second base corner 82 of the first notch 62 on the shelf 56. In this manner, the first port outlet 74 and the second port outlet 80 of the first notch 62 may be disposed at opposite first and second base corners 76, 82 of the first notch 62. A similar arrangement may be employed for the second notch 64 defining first and second outlets of port cavities extending to the first and second ports. In this manner, the ports and cavities extending to the first notch and/or the second notch may be sized and configured for positioning electrodes 86, 88 of the first and second electrode components 40, 42. In another embodiment, one or both of the notches, 62 or 64, or other port may include a pressure sensor configured to measure the pressure of the propellant at the shelf 56.

Figure 4:
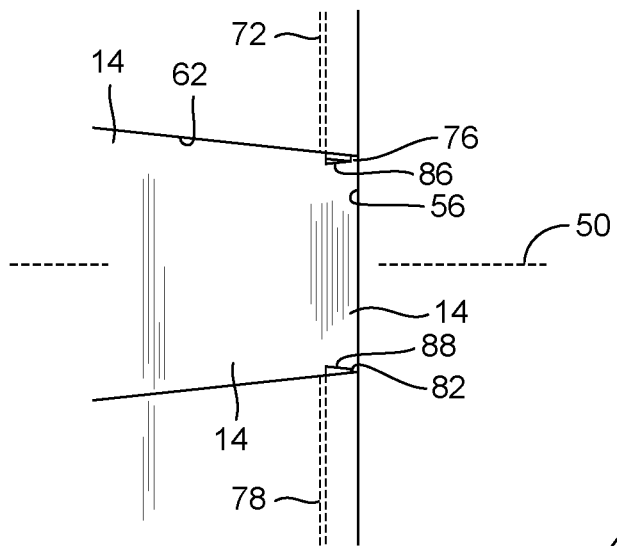
FIG. 4 is an enlarged view of detail 4 in FIG. 3A, depicting electrodes adjacent an internal surface, according to another embodiment of the present invention.

With respect to FIGS. 3A and 4, as set forth, the ignition system 12 or pre-combustion portion includes first and second electrode components 40, 42. The first and second electrode components 40, 42 may each include at least a conductive electrical wire that serves as an electrode at the end of the wire. Such electrode components may be embedded and positioned within the first and second ports 68, 70 so that respective first and second electrodes 86, 88 are exposed within the bore 48 and, more particularly at the first and second port outlets 74, 80 defined in, for example, the first notch 62. Within the bore 48, the first and second electrodes 86, 88 may be spaced a distance from each other so that, upon being electrically activated, the first and second electrodes 86, 88 provide a voltage potential or an electrical field potential adjacent the internal surface 14 between the first and second electrodes 86, 88. As depicted, such distance or spacing between the first and second electrodes 86, 88 may be defined by the first and second base corners 76, 82 in, for example, the first notch 62 in the bore 48. Further, the first and second electrodes 86, 88 may be exposed at and flush with the internal surface 14 of the bore 48. In another embodiment, the first and second electrodes 86, 88 may protrude from the internal surface 14 of the bore 48. Similar to that set forth above, another set of first and second electrodes 86, 88 may be positioned and spaced at the second notch 64.

As set forth, the housing 20 and bore 48 of this embodiment may include a step configuration to define the shelf 56. The shelf 56 may be sized and configured to act as an impingement to the oxidizer or an impingement shelf to slow the oxidizer from moving down stream so as to increase the pressure of the oxidizer at the shelf 56. The increase in pressure of the oxidizer at the shelf 56 may provide sufficient oxidizer for a combustion reaction of a solid grain fuel material on the internal surface 14. Suitable oxidizers may include gaseous oxygen, liquid oxygen, nitrous oxide, hydrogen peroxide, hydroxylammonium nitrate, ammonium dinitramide, or air. The oxidizer pressure increase at the impingement shelf 56 may enable the first and second electrodes 86, 88 to be minimally spaced (or minimally charged) to provide a charge concentration or voltage potential on the internal surface 14 of the bore 48 between the first and second electrodes 86, 88.

Figure 5:
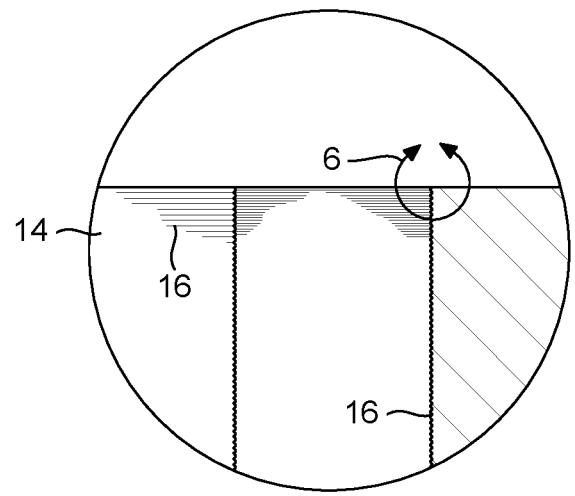
FIG. 5 is an enlarged view of detail 5 in FIG. 3B, depicting multiple layers defined in the igniter system, according to another embodiment of the present invention.

With respect to FIGS. 3B, 5, and 6, the housing 20 of the ignition system 12 may be formed from a solid grain fuel material. In one embodiment, the solid grain fuel material may be high or low density Acrylonitrile Butadiene Styrene (ABS) or any other suitable grain fuel material that holds similar electro-mechanical, combustion, and structural properties. As set forth, the housing 20 may be formed with multiple flat layers 18 deposited upon each other, employing the Fused Deposition Modeling (FDM) method or three-dimensional printing or any other suitable process for layering a fuel grain. Upon employing the FDM method, ABS possesses a very unique electro-mechanical property such that additive manufacturing results in a distinctive surface structure that is different than the surface of a monolithically fabricated (e.g., a molded or machined) ABS structure. In particular, this surface structure, such as the internal surface 14 defining the bore 48, is the surface structure that is transverse to a plane defined by any one of the multiple flat layers 18. Such surface structure or internal surface 14 has the effect of concentrating electrical charges locally when the surface 14 of the ABS material is subjected to an electrical potential field. These high-charge concentrations produce localized electrical arcing such that the ABS material breaks down at voltages significantly lower than that of a monolithically fabricated ABS structure. Described another way, the voltage potential created between the first and second electrodes 86, 88, when electrically activated, causes the unique features (the ridges 16 formed in the multiple flat layers 18 shown in FIG. 6) of the surface 14 to act as micro-electrodes which ignites the solid grain fuel material in the presence of an oxidizer.

In one embodiment, the multiple flat layers 18 may be deposited so that any one of the flat layers 18 define a plane that is transverse or perpendicular with the axis 50 of the housing 20. In another embodiment, the first and second electrodes 86, 88 (see FIG. 4) may define a line therebetween that may be generally parallel with a plane defined by each of the multiple flat layers 18. In still another embodiment, each of the flat layers 18 may define a plane that is substantially parallel with the axis 50 of the housing 20. In any one of these embodiments, the multiple flat layers 18, deposited upon each other, form the internal surface 14 with ridges 16 or ridged layering. The ridges 16 or ridged layering may be defined by peripheral ends 90 of the multiple flat layers 18. As set forth, the unique mechanical structure (e.g., the surface characteristics created by the FMD layering) of the ridges 16 and multiple flat layers 18, in conjunction of the material being a solid grain fuel, such as ABS material, act as multiple micro-electrodes when subjected to an electrical potential field. Such unique mechanical structure facilitates the ignition system 12 to implement multiple re-starts. For example, even as material from the internal surface 14 is initially consumed or removed through combustion, a newly exposed internal surface 14 maintains similar surface characteristics or surface roughness that act as micro-electrodes when exposed to an electrical potential field.

With respect to FIG. 6, an enlarged view of the multiple flat layers 18 and ridges of the fuel grain material are depicted. As set forth, the internal surface 14 defines ridges or ridged layering formed between each of the multiple flat layers 18. Each of the flat layers 18 may include a peak 92 with a small radius at its peripheral end such that the structure may also include a slope extending to the peak that may be substantially linear or radial. Although depicted as uniform ridges 16, such ridges may not be uniform along the internal surface 14 of the housing 20. In this manner, the internal surface 14 may exhibit a rough, coarse or scratched surface. The ridges may exhibit a nodal configuration or exhibit a protruding structure that may continue or discontinue along the peripheral end 90 of each of the multiple flat layers 18. Likewise, the internal surface 14 may exhibit grooves 94 formed between each of the multiple flat layers 18. In other words, each groove 94 extends between adjacently extending ridges 16. With this arrangement, the FDM technique of forming the housing, preferably with ABS material, provides for a unique electro-mechanical structure such that the flat layers 18 that exhibit the ridges 16 and/or grooves 94 therein reacts to an electrical potential field. In this manner, the structure and material itself act as multiple micro-electrodes, thereby, facilitating electrical breakdown to facilitate a re-startable ignition for a hybrid rocket system.

Figure 7:
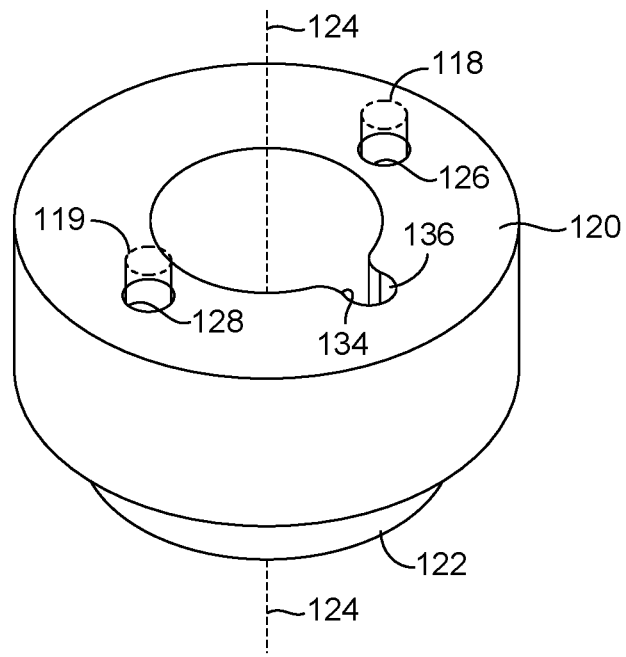
FIG. 7 is a perspective view of another embodiment of an igniter system, according to the present invention.
Figures 8, 8A:
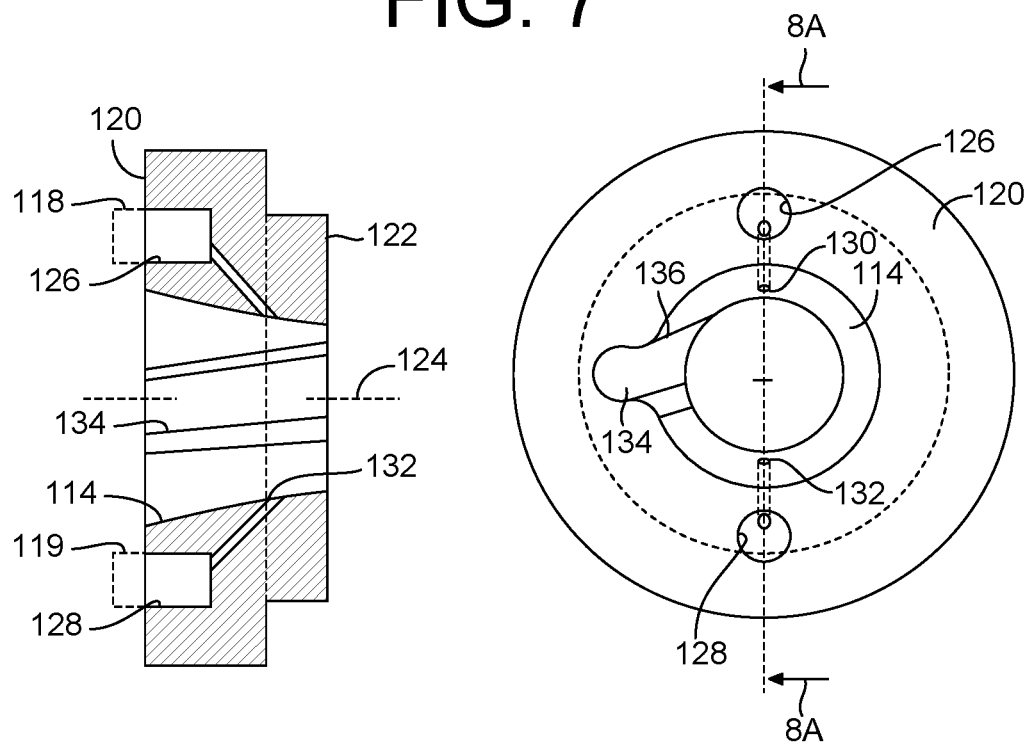
FIG. 8 is a top view of the igniter system of FIG. 7, according to another embodiment of the present invention.
FIG. 8A is a cross-sectional view of the igniter system taken along section 8A of FIG. 8, according to another embodiment of the present invention.

With respect to FIGS. 7, 8, and 8A, another embodiment of an ignition system 110 for a hybrid rocket system 10 (FIG. 1) is provided. This embodiment is similar to the previous embodiment, except this embodiment exhibits a bore 112, defined by an internal surface 114, with a convergent or conical configuration. For example, the ignition system 110 may include a housing 116 and first and second electrode components 118, 119. The housing 116 may include a first side 120 and a second side 122 with the bore 112 extending through and between the first and second sides 120, 122. The bore 112 may define a centrally located axis 124 extending along the length of the housing 116. The housing 116 may include first and second electrode ports 126, 128 that may extend from the first side 120 to a convergent portion of the bore 112 so that a first and second electrode 130, 132 may be exposed within the bore 112. The housing 116 may also include a pressure port 134 with a corresponding pressure sensor 136 so that a pressure within the bore 112 may be determined upon receiving the propellant. Similar to that described and depicted in FIG. 6 of the previous embodiment, the housing 116 of this embodiment may be formed with multiple flat layers 18 that exhibit a roughened surface or ridges 16 that provide the before-discussed unique structural characteristic along the internal surface 114 of the conical bore 112. In this manner, upon the first and second electrodes 130, 132 being activated to provide an electrical potential field, the multiple flat layers 18 deposited upon each other and exhibiting the ridges 16 and/or grooves 94 react and concentrate a charge, thereby, acting as multiple micro-electrodes at the internal surface 114 of the bore 112.

As set forth in this embodiment, the bore 112 in the housing 116 is convergent. The bore 112 may be sized and configured to converge so as to increase the pressure of the oxidizer as it moves downstream through the bore 112. The increase in pressure of the oxidizer as it moves downstream through the bore 112 may provide sufficient oxidizer for a combustion reaction of a solid grain fuel material on the internal surface 114. Suitable oxidizers may include gaseous oxygen, liquid oxygen, nitrous oxide, hydrogen peroxide, hydroxylammonium nitrate, ammonium dinitramide, or air. The oxidizer pressure increase at the narrower portion of the bore 112 may enable the first and second electrodes 130, 132 to be minimally spaced (or minimally charged) to provide a charge concentration or voltage potential on the internal surface 114 of the convergent portion of the bore 112 between the first and second electrodes 130, 132.

Similar to previous embodiments, the multiple flat layers 18, deposited upon each other, form the internal surface 114 with ridges 16 or ridged layering. The unique mechanical structure (e.g., the surface characteristics created by the FMD layering) of the ridges 16 and multiple flat layers 18, in conjunction of the material being a solid grain fuel, such as ABS material, act as multiple micro-electrodes on the internal surface 114 when subjected to an electrical potential field. Such unique mechanical structure facilitates the ignition system 116 to implement multiple re-starts. For example, even as material from the internal surface 114 is initially consumed or removed through combustion, a newly exposed internal surface 114 maintains similar surface characteristics or surface roughness that act as micro-electrodes when exposed to an electrical potential field from charged electrodes 130, 132.

A thrust augmented nozzle (TAN) for hybrid rocket systems is also disclosed herein. The TAN design may retrofit an existing hybrid rocket system burning an oxidizer solution (e.g., 90% solution of Hydrogen Peroxide) and a polymer (e.g., Acrylonitrile-Butadiene-Styrene (ABS)) as propellants. The design may leverage 3-D additive manufacturing to embed a helical fuel port into the thrust chamber of a hybrid rocket burning hydrogen peroxide and ABS as propellants. Other manufacturing techniques may be used to provide the helical port within the thrust chamber. The helical port may increase fuel regression rate, resulting in a fuel-rich plume exiting the nozzle throat, aiding in secondary combustion.

The TAN may also provide for injection of peroxide or other oxidant downstream of the throat of the rocket nozzle, wherein the hot unburned hydrocarbons spontaneously ignite and release heat from both secondary combustion and thermal decomposition of the peroxide. Secondary peroxide decomposition may also produce volumes of gas that are captured by the nozzle, thereby increasing the exit pressure. Secondary injection and combustion allows a high expansion ratio nozzle to be effective at low altitudes where there would normally be embedded shock waves.

One result of secondary injection downstream of the nozzle throat is an increase in thrust. In some examples, the increase is in the range of about 2% to about 10%, and more particularly in the range of about 4% to about 5% as compared to rockets that do not include secondary injection downstream of the throat. The measured thrust increase, when compared with a kinetic decomposition model, may correspond to partial decomposition. Some example nozzles may not allow adequate dwell time for completed composition. Techniques for TAN design optimization are discussed herein.

A thrust augmented nozzle such as the TAN embodiments disclosed herein may overcome some conventional limitations of hybrid rockets by injecting additional propellants downstream of the nozzle throat, resulting in secondary combustion. Downstream burning "fills-up" the nozzle and raises exit pressure. This effect allows an efficient high expansion ratio nozzle to operate at low altitudes without risk of flow field separation. When the nozzle is operated in TAN mode, the thrust increase results from two effects: 1) momentum flux due to the secondary flow of gases generated by combustion of the augmentation propellants, and 2) displacement of the flow of primary combustion gases by the secondary flow. This displacement reduces the exit flow area available to the core flow, thereby reducing overexpansion and exit plane pressure suction associated with overexpansion.

This thrust increase at sea-level conditions is very beneficial to overall launch vehicle performance. At lift-off conditions, the rocket is at its heaviest due to the large mass ratio of propellant. This is also where gravity losses are most significant. Due to these factors, thrust at lift off must be the highest that the entire launch stack can deliver. Unfortunately, this is also the point at which nozzles operate the least effectively. Using secondary injection greatly increases lift-off thrust, delivering the added thrust when it needed. Thrust augmentation acts as an extra rocket booster without the added mass of strap-on rocket boosters or extra engines. The thrust augmenting nozzle can also increase launch vehicle payload capacity.

Thrust augmented nozzle may be designed to operate with bi-propellant systems, and require a careful tuning of the fuel and oxidizer injection ratios. Furthermore, since the nozzle flow Mach numbers in the divergent section downstream of the throat were relatively high, the short residence time and relatively low pressures in the divergent portion of the nozzle (i.e., downstream of the nozzle throat) may not be as favorable for burning traditional rocket fuels like liquid rocket propellant-1 ("RP-1"). Combustion of hydrocarbon propellants is generally incomplete when using a bi-propellant TAN system. Bi-propellant TAN systems typically require the use of hydrogen as the downstream injected fuel source in order to achieve good combustion properties. This "dual-fuel" operating mode significantly increases the complexity of the system, and significantly reduces the volumetric specific impulse.

The TAN system disclosed herein reduces the complexity by using a hybrid rocket system that has been purposely tuned to burn significantly richer than stoichiometric, thereby leaving significant hot unburned hydrocarbon gas in the post-combustion chamber exit plume. When additional oxidizer is injected into this fuel-rich plume, combustion occurs spontaneously, thereby resulting in all of the previously-described TAN benefits, but with considerably lower system complexity as compared to a bi-propellant system.

The TAN design can retrofit an existing hybrid rocket system burning, for example, a 90% solution of Hydrogen Peroxide and Acrylonitrile-Butadiene-Styrene (ABS) as propellants, and may include an embedded helical fuel port. This helical port, fabricated using, for example, 3-D additive manufacturing, may increases fuel regression rates, resulting in a fuel-rich combustor exit plume. When peroxide is injected downstream of the throat, the hot unburned hydrocarbons spontaneously ignite, releasing heat from both secondary combustion and thermal decomposition of the peroxide. The secondary peroxide decomposition also produces large volumes of gas that are captured by the nozzle, significantly increasing the exit pressure. The result of secondary injection is a 4% increase in thrust. The measured thrust increase was compared with a kinetic decomposition model and was shown to correspond to partial decomposition. Clearly, the tested nozzle did not allow adequate dwell time for complete decomposition. Techniques for design optimization are discussed.

The Thrust Augmented Nozzle (TAN) technology researched by this study offers a practical solution for altitude compensation by operating an over expanded nozzle at low altitudes, then "filling up" the nozzle to match ambient exit pressure, and injecting and burning propellant downstream of the throat in the divergent section of the nozzle. By injecting propellant into the divergent section of the over expanded nozzle, the exit pressure is increased and is driven towards am more optimal level. The secondary mass flow can be varied based on ambient conditions, making the TAN system a viable operational option.

Figure 9A:
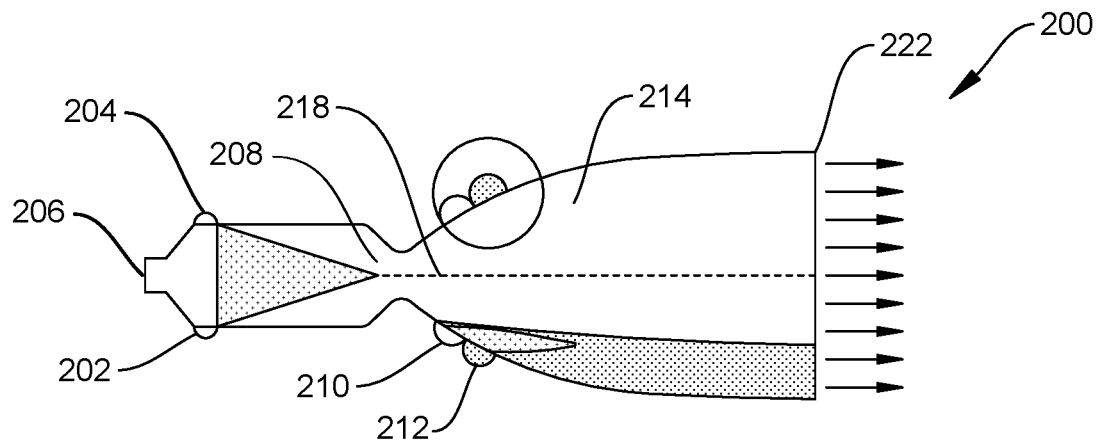
FIG. 9A is a cross-sectional side view of a rocket nozzle according to another embodiment of the present invention.
Figure 9B:
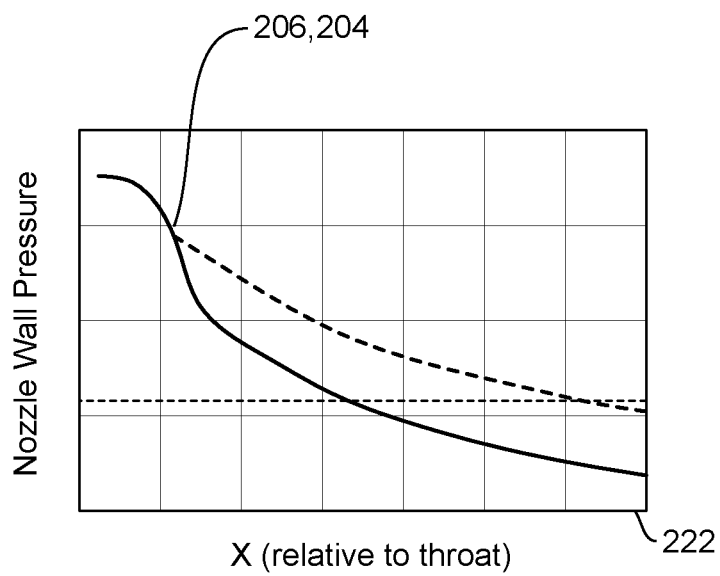
FIG. 9B is a graph showing nozzle wall pressure measurements along the length of the rocket nozzle shown in FIG. 9A.

FIGS. 9A and 9B illustrate aspects of the TAN concept using an example rocket nozzle 200 and associated graph showing nozzle wall pressure as a function of position along the length of the nozzle. The TAN system may include injection of both fuel and oxidizer into the diverging core flow. This process has been demonstrated to give gains in performance, for example, to increase the thrust to weight ratio of a 650 klbf-thrust class engine by more than about 60%. A primary issue associated with bi-propellant TAN systems is that two injection flow paths are required, and these propellants typically dwell within the nozzle with sufficient time to allow combustion. Thus, because of the high supersonic flow conditions in the divergent nozzle section, dwell times are limited and tuning the characteristic lengths of the system is difficult.

The nozzle 200 may include a combustion chamber 202, primary fuel inlet 204, primary oxidizer inlet 206, and throat 208. Primary combustion occurs in the combustion chamber 202. A flow of primary gas 218 flows through the throat 208 and into the diverging expansion section 214 of the nozzle 200. A secondary fuel inlet 210 and secondary oxidizer inlet 212 are positioned in the expansion section 214 at a location between the throat 208 and a nozzle exit 222.

Applying single-propellant secondary injection to a medium-scale hybrid rocket system may be a practical way to achieve TAN. The underlying concept includes burning the rocket system fuel-rich, and then injecting oxidizer downstream of the nozzle throat 208 via the secondary oxidizer inlet 212 into the hot flow field of the gas 218. When the secondary oxidizer is injected into the nozzle downstream of the throat 208, the hot unburned, pyrolyzed hydrocarbons in the plume spontaneously ignite. Since the associated fuel in the combustion products was already partially decomposed, the system re-ignites more readily than in a bi-propellant system. The simplicity of only requiring one secondary injection path may also provide benefits for increased combustion.

The present disclosure may replace the relatively inert and low specific gravity GOX oxidizer with a significantly denser and more reactive propellant such as 90% hydrogen peroxide, $H_2O_2$, although other propellants may be used to achieve similar advantageous results. Hydrogen peroxide is not only an efficient oxidizer, but it possesses a powerful decomposition reaction that releases, in at least some instances, about 100 kJ for every mole of hydrogen peroxide that is decomposed.

In the nozzle 200, when peroxide is injected downstream of the throat 208, any unburned hydrocarbons will burn with the oxygen released by the thermal decomposition. Thus, heat is derived from both thermal decomposition and secondary combustion of released oxygen with residual fuel in the core flow. The secondary peroxide decomposition may also produce volumes of gas that are captured by the nozzle 200, which may increase the exit pressure. Further, the stoichiometric O/F ratio for 90% $H_2O_2$ and ABS combustion is about 5.5. Thus, achieving a desired TAN effect may require a less rich fuel plume as compared to, for example, a bi-propellant system.

A basic hybrid rocket system may leverage a novel, non-catalytic arc-ignition system to thermally decompose the core hydrogen peroxide flow. The arc-ignition technology derives from the electrical breakdown properties of certain 3-D printed thermoplastics like Acrylonitrile Butadiene Styrene (ABS), Low Density Polyethylene (LDPE), and High-Impact-Polystyrene (HIPS). The arc-ignition concept has been engineered into a power-efficient system that can be started, stopped, and restarted with a high degree of reliability as described above with reference to FIGS. 1-8A.

In the non-catalytic approach disclosed herein, the peroxide flow may be pre-led by a small flow of gaseous oxygen injected into a combustion chamber lined with, for example, the 3-D printed ABS fuel. The arc-ignition system may initiate combustion between the injected oxygen and the fuel source, and be followed by the peroxide flow. The GOX/ABS combustion may generate temperatures exceeding 2800° C., and specific enthalpies greater than 8.5 MJ/kg. Thus, with the properly tuned GOX pre-lead mass flow, there may exist sufficient energy to decompose the incoming peroxide flow, while simultaneously initiating full-length hybrid combustion.

FIG. 9B shows at the far right of the graph the thrust increase (i.e., increased pressure represented by the broken line compared to the solid line representing primary combustion) at the nozzle end 222 due to the secondary combustion in the expansion section 214.

Once hydrogen peroxide decomposition begins, then the additional energy of decomposition contributes to the overall combustion process. After the GOX pre-lead is terminated, combustion is sustained by the oxygen liberated by the thermal decomposition of the hydrogen peroxide. The arc ignition process may be energy efficient and require as little as 10 W for less than one second. Typical ignition energies are less than about 10 Joules. Over-expanded nozzles may develop concentrations as low as 85%.

Figure 10:
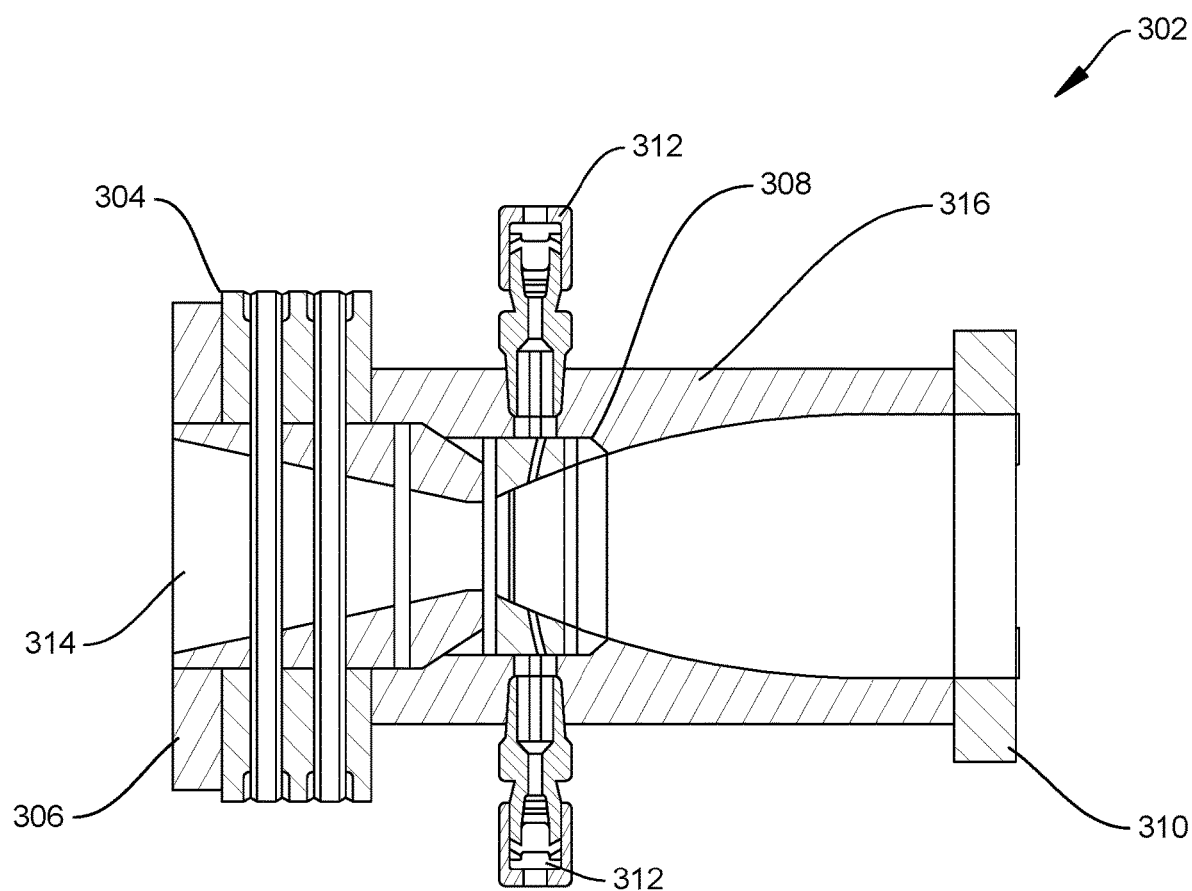
FIG. 10 is a cross-sectional side view of another rocket nozzle embodiment in accordance with the present disclosure.
Figure 11:
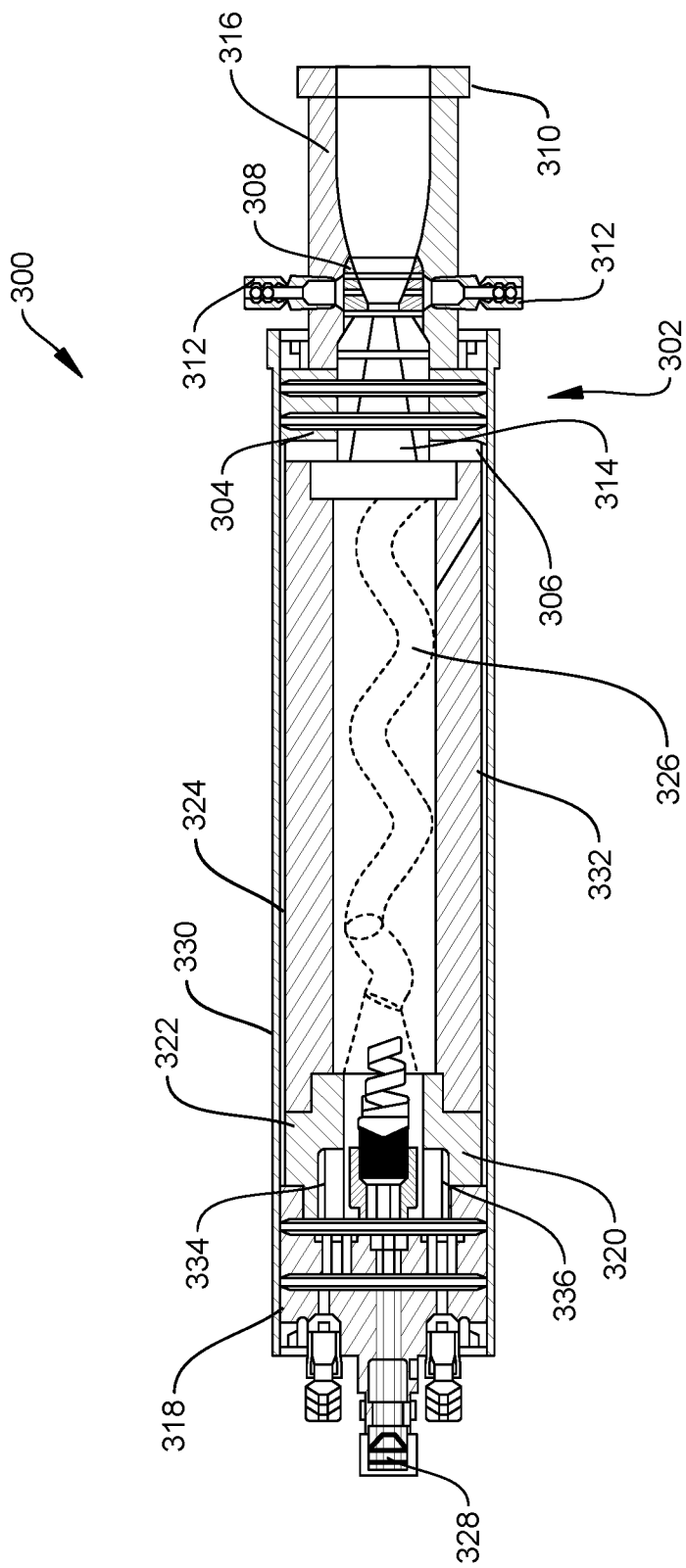
FIG. 11 is a cross-sectional side view of another rocket nozzle embodiment in accordance with the present disclosure.

FIG. 10 illustrates an example thrust augmentation nozzle (TAN) 302, which may be a component of a rocket nozzle assembly, such as the rocket nozzle 300 shown in FIG. 11. The thrust augmentation nozzle 302 includes a nozzle to motor adapter 304, a spacer 306, a secondary injection insert 308 having one or more secondary oxidizer inlets 312, an exit pressure flange 310, a throat 314, and an expansion section 316. The secondary injection insert 308 may provide a secondary flow of oxidant into the flow of gas passing from the throat 314 into the expansion section 316 via the secondary oxidizer inlets 312. The adapter 304 and spacer 306 may provide a connection and interface between the thrust augmentation nozzle 302 and other components of the rocket nozzle (e.g., rocket nozzle 300 shown in FIG. 11). The secondary oxidizer may include, for example, hydrogen peroxide.

The nozzle 302 may be built in modular fashion, allowing the injector section to be replaced in order to study the effects of secondary injection position and angle. In one example, a 10° forward-facing injection angle just aft of the nozzle throat 314 was selected in order to achieve better mixing and increase dwell-time of the injected peroxide solution. For this design the nozzle expansion ratio was 16:1, and at the combustion operating chamber pressures, a shock wave was predicted to develop upstream of the nozzle exit with no secondary injection.

In some embodiments, a secondary peroxide tank can be added to the original system. Measurements available may include motor thrust, primary and secondary peroxide mass flow rate, pre-led GOX mass flow rate, primary and secondary injection pressures, chamber pressure, primary and secondary tan pressures, and total consumed propellant mass. Multiple thermocouple measurements may also be installed, and their measurements may be used as a part of a fire control safety management system.

In one example, the system includes three tanks, a control box, dump valves, and a dump bucket on the bottom shelf of the cart. Both peroxide tanks may be pressurized from the same nitrogen tank. The GOX tank may be, for example, a relatively small carbon composite overwrap paintball tank. The $CO_2$ tank provides pilot pressure for the four pneumatic actuated ball valves. The dump valves are used to remotely drain the peroxide tanks into the dump bucket, which is partially filled with water.

FIG. 11 shows the hybrid rocket motor 300, including the TAN 302. A three-piece fuel grain consists of a 3D-printed arc-ignition cap 322, extruded fuel grain 332, and 3D-printed helical fuel grain insert 326, which may be contained with a case 330 and be surrounded by a composite liner 324. Making the grain in this manner may reduce manufacturing costs and provide other advantages. The coaxial design of motor 300 may help increase burn uniformity. The hollow-cone injector 320 design of motor 300 may supply shorter latencies and higher combustion efficiency. GOX may be injected through the outer concentric injection ports 312, and hydrogen peroxide through the middle hollow-cone style injector 328 of an injector cap 318. Once full decomposition has been initiated, the reaction is self-sustaining and the GOX is shut off. Overall for typical tests, the arc-ignitors 334, 336 may be activated, for example, for two seconds and GOX is used, for example, for two seconds; one second before peroxide injection and one second after.

Figure 12:
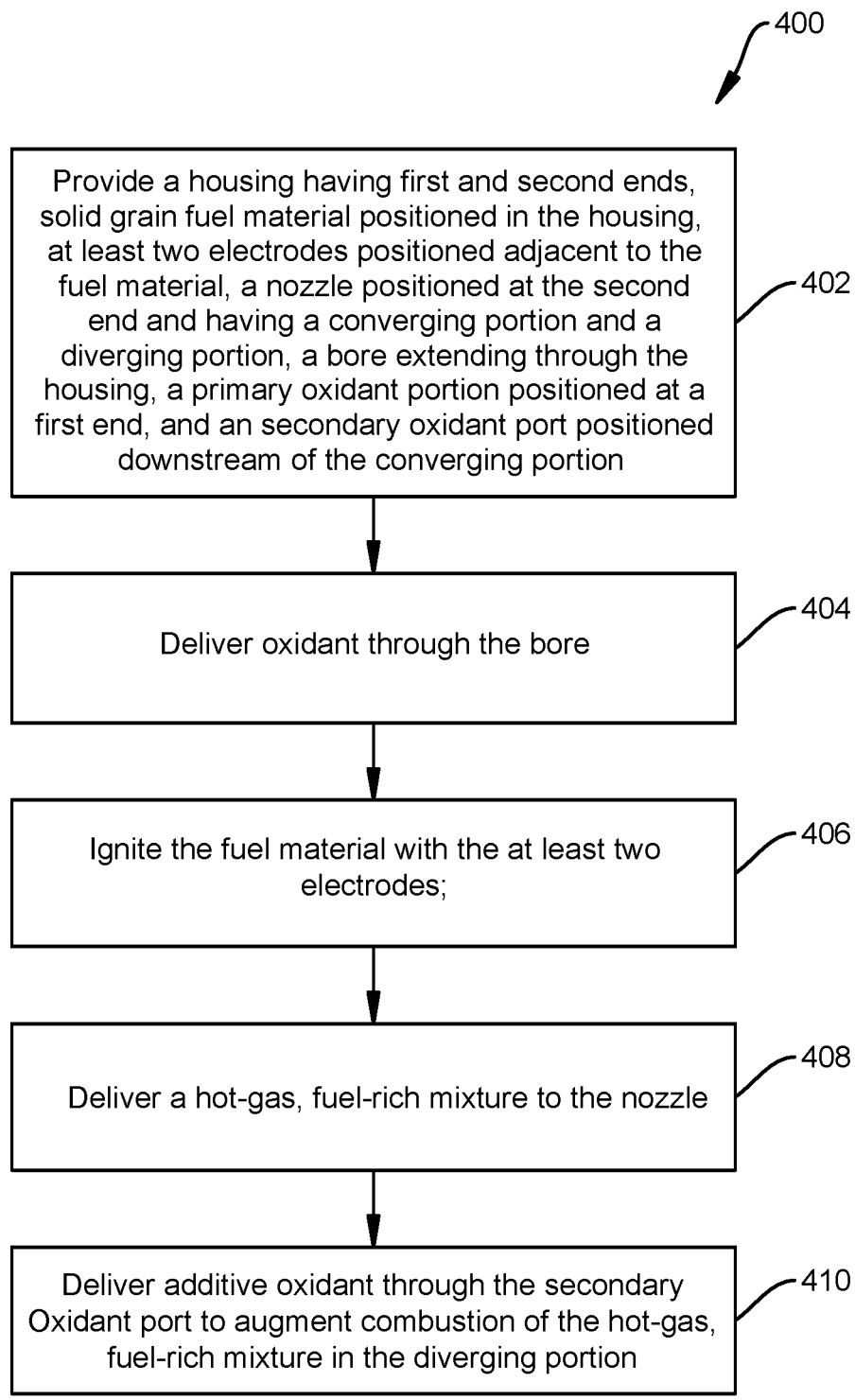
FIG. 12 is a flow diagram showing steps of an example method in accordance with the present disclosure.

FIG. 12 illustrates steps of an example method 400, which may be one example of a method of augmenting combustion in a hybrid rocket, such as one or more of the rockets disclosed with reference to FIGS. 1-11. The method 400 may include, at 402 providing a housing having first and second ends, solid grain fuel material positioned in the housing, at least two electrodes positioned adjacent to the fuel material, a nozzle positioned at the second end and having a converging portion and a diverging portion, a bore extending through the housing, a primary oxidant portion positioned at a first end, and a secondary oxidant port positioned downstream of the converging portion. At 404, the method 400 includes delivering oxidant through the bore. At 406, the method 400 includes igniting the fuel material with the at least two electrodes. The method 400 includes, at 408, delivering a hot-gas, fuel-rich mixture to the nozzle, and at 410 delivering additive oxidant through the secondary oxidant port to augment combustion of the hot-gas, fuel-rich mixture in the diverging portion.

The method 400 may also include providing the fuel material with an internal surface, the internal surface including exposed ridges, and the at least two electrodes are configured to concentrate an electrical charge on the ridges to ignite the internal surface, wherein the hybrid rocket is configured such that as the fuel material at the internal surface is initially consumed or removed through combustion of the fuel material, newly exposed ridges are available for re-igniting the fuel material upon being subjected to the electrical charge. The additive oxidant may include at least 85% $H_2O_2$, and the fuel material comprises Acrylonitrile Butadiene Styrene (ABS) material. The additive oxidant port may include a plurality of secondary oxidant ports positioned circumferentially around the divergent portion of the nozzle. The bore may be helical.

The hydrogen peroxide injected thrust augmenting nozzle concept has been tested and analyzed. Previous studies using GOX as a secondary injectant have been shown to increase thrust with sufficiently fuel-rich core flow. While this worked well as a means of increasing the thrust of the down-tuned hybrid rocket, it was desired that this dependency on fuel-rich core flow be mitigated. As a solution, hydrogen peroxide replaced GOX as a secondary injectant. Hydrogen peroxide undergoes an energetic decomposition when heated to high temperatures and works well as a high-density oxidizer.

The thrust augmenting nozzle used in the previous TAN test campaign was retrofitted to an existing hydrogen peroxide/ABS hybrid rocket. Application of hydrogen peroxide to the TAN was shown to improve thrust through a series of static hot-fire tests. An increase in thrust was detected using load-cell measurements and comparing that value to baseline cases. Secondary combustion was also evident based on plume observations. The angle of gases as they escaped the nozzle increased with secondary injection, showing that there was an increase in nozzle pressure.

While a definite increase in thrust was measured, the increase was far less than that found in theory. This was found to be due to an insufficient dwell time in the rocket nozzle. According to a decomposition and combustion kinetic model, the peroxide was calculated to be somewhere between 70% maximum and 5% minimum. The test data showed that a "sweet spot" existed at a secondary mass flow rate of about 10 to 11 g/s or and augmentation ratio of about 10%. At higher mass flow rates, the energy required to vaporize the peroxide began to overpower the combustion reaction. This dwell time issue is easily mitigated by increasing the nozzle length. According to the model, a nozzle length on the order of a foot could be sufficient to vaporize and decompose all peroxide given a small enough initial droplet diameter and adequate mixing.

The effects of thrust augmentation were explored for various flow rates and expansion ratios assuming an infinite nozzle length. It was found that the effects of secondary injection become more pronounced with higher expansion ratios. At higher expansion ratios, larger than 25:1, sea-level specific impulse increases with added secondary mass flow. When looking at mission averaged specific impulse, it was found that significant increases in thrust could be obtained using secondary injection with only minimal losses in specific impulse.

This study has shown the feasibility of the hydrogen peroxide injected thrust augmenting nozzle and its limitations. The main limitation for this application was found to be dwell time and nozzle length. Significant thrust augmentation using hydrogen peroxide is not attainable using the three inch long nozzle that was used in the test campaign. Remedies to this include increasing the nozzle length, providing better atomization of injected propellant, or using a catalyst to initiate decomposition and vaporization.

Increasing the length of the nozzle, while the simplest solution, may be less feasible than other options. In dwell time studies, it was found that the required nozzle length for full decomposition could be in excess of three feet, depending on degree of droplet atomization achieved. This would work for larger launch configurations, but not as well for smaller launch vehicles. Droplet size can be decreased using smaller injectors. This would also increase penetration and mixing.

Thrust augmentation with hydrogen peroxide has the ability to act as an altitude compensating nozzle and as a built-in rocket booster. Increased thrust due to secondary injection has been demonstrated. With sufficient follow-up testing and engineering the hydrogen peroxide injecting thrust augmenting nozzle has the potential to revolutionize the launch vehicle industry.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A hybrid rocket, comprising:
a housing having a first end and a second ends;
a solid-grain fuel material positioned in the housing and defining a bore that extends from the first end to the second end, the bore in the solid-grain fuel material defining an internal surface of the solid-grain fuel material exposed within the housing;
at least two electrodes positioned adjacent to the solid-grain fuel material and extending through the housing to the internal surface of the solid-grain fuel material to ignite the solid-grain fuel material at the first end;
a primary oxidizer port positioned at the first end to inject a primary oxidizer to flow in a downstream direction from the first end to the second end;
a nozzle positioned at the second end and having a converging portion and a diverging portion; and
a secondary oxidizer port to inject a secondary oxidizer downstream of the converging portion; wherein:
the bore has a geometry configured to produce a hot-gas, fuel-rich mixture at the nozzle as the solid-grain fuel material and the primary oxidizer burn while flowing downstream, and
the diverging portion is configured to spontaneously combust the secondary oxidizer and the hot-gas, fuel-rich mixture.

2. The hybrid rocket of claim 1, wherein the solid-grain fuel material includes a plurality of flat layers of the solid-grain fuel material.

3. The hybrid rocket of claim 1, wherein the secondary oxidizer includes $H_2O_2$.

4. The hybrid rocket of claim 1, wherein the bore geometry is a helix.

5. The hybrid rocket of claim 1, wherein the at least two electrodes produce localized electrical arcing to ignite the solid-grain fuel material.

6. The hybrid rocket of claim 1, wherein the at least two electrodes are configured to be spaced apart so as to provide an electrical potential field along a surface of the solid-grain fuel material that is positioned between the at least two electrodes.

7. The hybrid rocket of claim 1, wherein the internal surface of the solid-grain fuel material includes has a plurality of exposed ridges, and the at least two electrodes are configured to concentrate an electrical charge on the ridges to ignite the internal surface of the solid-grain fuel material; and
the hybrid rocket is configured such that as the solid-grain fuel material at the internal surface of the solid-grain fuel material is initially consumed or removed through combustion of the solid-grain fuel material, newly exposed ridges are available for re-igniting the solid-grain fuel material upon being subjected to the electrical charge.

8. The hybrid rocket of claim 1, wherein the solid-grain fuel material is an Acrylonitrile Butadiene Styrene (ABS) material.

9. A hybrid rocket, comprising:
a housing having a first end and a second end;
a solid-grain fuel material positioned in the housing and defining a bore that extends from the first end to the second end, the bore in the solid-grain fuel material defining an internal surface of the solid-grain fuel material exposed within the housing;
at least two electrodes positioned adjacent to the solid-grain fuel material and extending through the housing to the internal surface of the solid-grain fuel material to ignite the solid-grain fuel material at the first end;
a primary oxidizer port positioned at the first end to inject a primary oxidizer to flow in a downstream direction from the first end to the second end;
a nozzle positioned at the second end and having a converging portion and a diverging portion;
an additive oxidizer port to inject an additive oxidizer downstream of the converging portion, the additive oxidizer comprising at least 85% $H_2O_2$; wherein:
the bore has a geometry configured to produce a hot-gas, fuel-rich mixture at the nozzle as the solid grain fuel material and the primary oxidizer burn while flowing downstream, and the diverging portion is configured to spontaneously combust the additive oxidizer and the hot-gas, fuel-rich mixture.

10. The hybrid rocket of claim 9, wherein the bore geometry is a helix.

11. The hybrid rocket of claim 9, wherein the solid-grain fuel material includes a plurality of flat layers of solid-grain fuel material.

12. The hybrid rocket of claim 9, wherein the at least two electrodes produce localized electrical arcing to ignite the solid-grain fuel material.

13. The hybrid rocket of claim 9, wherein the internal surface of the solid-grain fuel material includes a plurality of exposed ridges, and the at least two electrodes are configured to concentrate an electrical charge on the ridges to ignite the internal surface of the solid-grain fuel material; and the hybrid rocket is configured such that as the solid-grain fuel material at the internal surface of the solid-grain fuel material is initially consumed or removed through combustion of the solid-grain fuel material, newly exposed ridges are available for re-igniting the solid-grain fuel material upon being subjected to the electrical charge.

14. A method of augmenting combustion in a hybrid rocket, comprising:

providing a housing having a first end and a second end, a solid-grain fuel material positioned in the housing and defining a bore that extends from the first end to the second end, the bore in the solid-grain fuel material defining an internal surface of the solid-grain fuel material exposed within the housing, at least two electrodes positioned adjacent to the solid-grain fuel material and extending through the housing to the internal surface of the solid-grain fuel material at the first end, a nozzle positioned at the second end and having a converging portion and a diverging portion, a primary oxidizer port positioned at the first end, and a secondary oxidizer port positioned downstream of the converging portion;

delivering a primary oxidizer into the bore at the primary oxidizer port;

igniting the solid-grain fuel material at the first end with the at least two electrodes;

delivering a hot-gas, fuel-rich mixture to the nozzle through the bore, the bore has a geometry configured to produce the hot-gas, fuel-rich mixture at the nozzle as the solid-grain fuel material and the primary oxidizer burn while flowing downstream;

delivering a secondary oxidizer through the secondary oxidizer port to spontaneously combust the additive oxidizer and the hot-gas, fuel-rich mixture in the diverging portion.

15. The method of claim 14, further comprising:

providing the internal surface of the solid-grain fuel material with a plurality of exposed ridges, and the at least two electrodes are configured to concentrate an electrical charge on the ridges to ignite the internal surface of the solid-grain fuel material; and the hybrid rocket is configured such that as the solid-grain fuel material at the internal surface is initially consumed or removed through combustion of the solid-grain fuel material, newly exposed ridges are available for re-igniting the solid-grain fuel material upon being subjected to the electrical charge.

16. The method of claim 14, wherein the secondary oxidizer comprises at least 85% $H_2O_2$, and the solid-grain fuel material comprises Acrylonitrile Butadiene Styrene (ABS) material.

17. The method of claim 14, wherein the secondary oxidizer port includes a plurality of secondary oxidizer ports positioned circumferentially around the divergent portion of the nozzle.

18. The method of claim 14, wherein the bore is helical.

* * * * *